Jan. 9, 1923. 1,441,590.
C. LALANNE.
COMBINATION MIRROR.
FILED MAY 22, 1922.
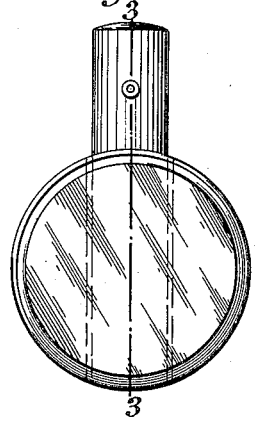
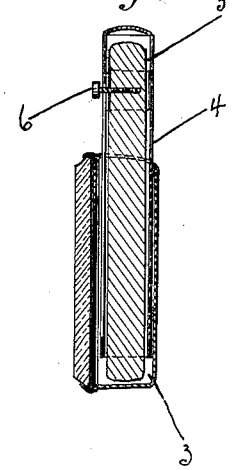
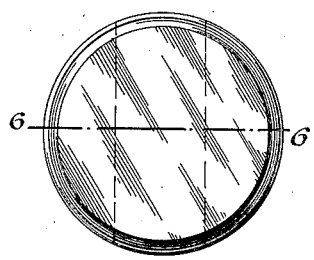
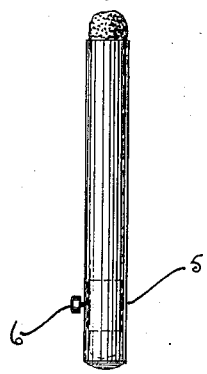
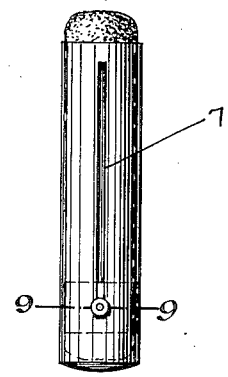
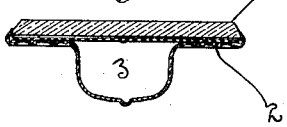
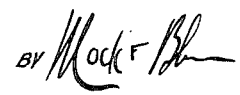

Patented Jan. 9, 1923.

1,441,590

UNITED STATES PATENT OFFICE.

CHARLES LALANNE, OF PARIS, FRANCE.

COMBINATION MIRROR.

Application filed May 22, 1922. Serial No. 562,930.

*To all whom it may concern:*

Be it known that CHARLES LALANNE, citizen of France, residing at 104 Faubourg St. Honore, Paris, France, has invented certain new and useful Improvements in Combination Mirrors, of which the following is a specification.

This invention relates to combination mirrors and more particularly to an improved combination of a mirror and a lipstick. My invention has for its object to provide a lipstick with a mirror attached in which the combination of these two articles will occupy the minimum of space in a lady's handbag. A further object of my invention is to provide a mirror in which the body of the lipstick will serve as the handle of the mirror.

Further objects of my invention will be apparent from the drawings in which Figure 1 is a perspective of the improved combination lipstick and mirror. Figure 2 is a side view thereof. Figure 3 is a section of the view illustrated in Figure 2. Figure 4 is an end view. Figure 5 is a view of the mirror alone. Figure 6 is a section of the device taken along the line 6—6 of Figure 5. Figure 7 is an independent side view of the lipstick. Figure 8 being a front view thereof, and Figure 9 is a sectional view along the line 9—9 of Figure 8.

The device comprises a mirror 1, having a back 2, the periphery of the back 2 being drawn over the mirror and the exterior of the back being hollow so as to receive the lipstick in the interior thereof. The back 2 is preferably made in one piece. In the opening 3, formed by the hollow back 2, is positioned the lipstick holder 4. The lipstick itself is firmly held by the small cap 5 having the screw 6 operating therein, the screw 6 being movable along the curve 7 shown in Figure 8 so that the lipstick may be pushed upward as it is used up. The holder 4 is held in the opening 3 of the handle 2 by frictional engagement so as to serve as a handle for the mirror 1. It will thus be seen that I have provided a compact and convenient combination of lipstick holder and mirror in which the holder for the lipstick also acts as a handle which may be lengthened at will, for the mirror.

Having thus described my invention what I claim is—

1. In combination, a mirror and a metallic backing for said mirror, the periphery of said backing being folded over the edge and front of said mirror to form a frame for said mirror, said backing being upraised so as to form a receptacle, a toilet-article holder engaging said receptacle and serving as a handle for the mirror.

2. As an article of manufacture, a mirror and its backing, the latter being formed with a member for the reception of a toilet-article holding device, and a toilet-article holding device movably engaging said member and serving as a handle for the mirror.

In testimony whereof I hereunto affix my signature.

CHARLES LALANNE.